F. A. BRUCKMAN.
CONE BAKING DEVICE.
APPLICATION FILED AUG. 13, 1915.
Reissued Mar. 5, 1918. 14,439.
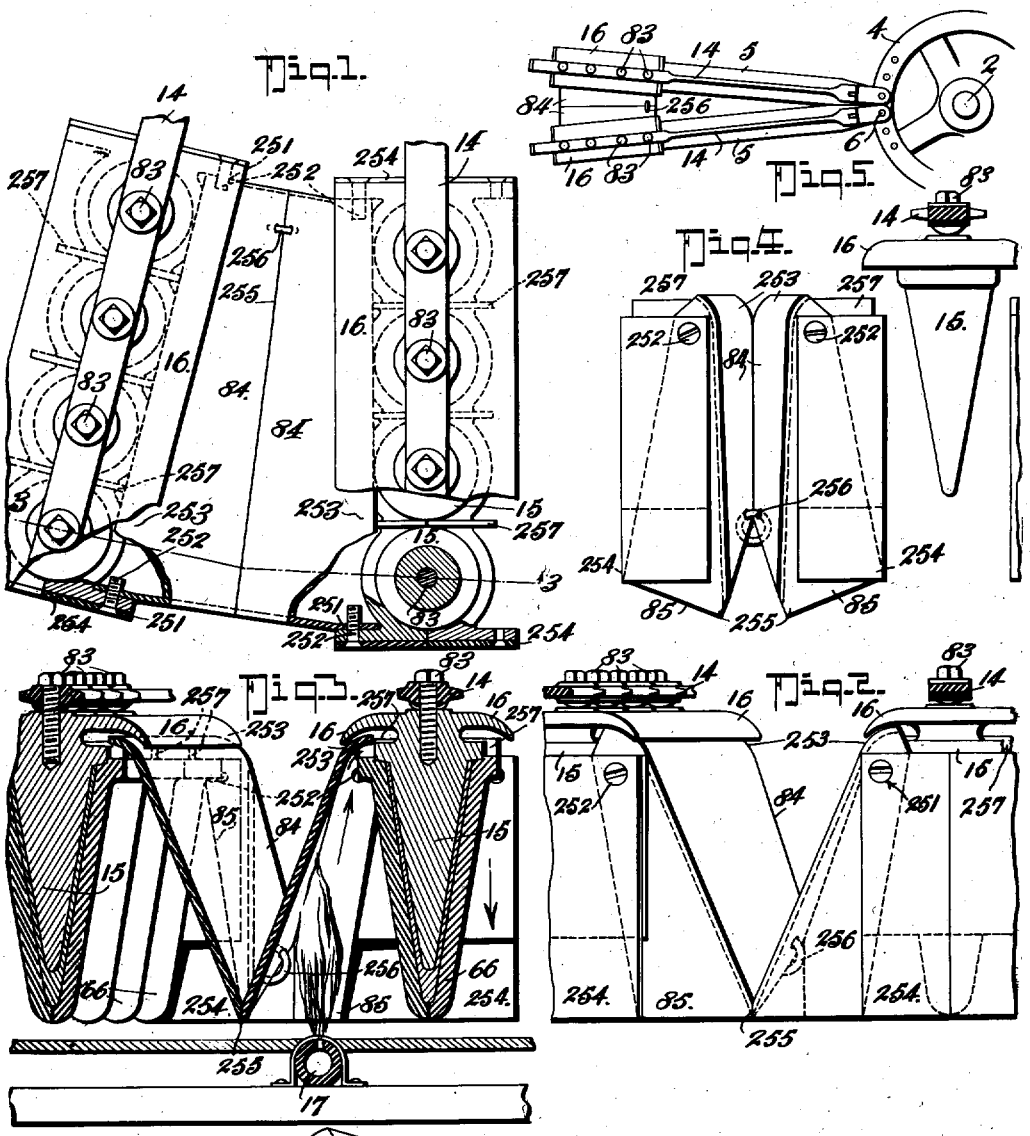
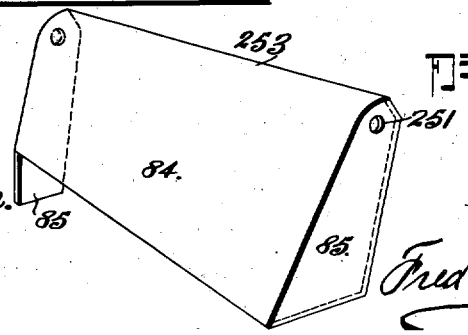
WITNESSES:
Charles J. Diller.
INVENTOR
F. A. Bruckman.
BY
Fred G. Dietrich & Co.
ATTORNEYS.

UNITED STATES PATENT OFFICE.

FREDERICK A. BRUCKMAN, OF PORTLAND, OREGON, ASSIGNOR OF ONE-FIFTH TO GEORGE W. WEATHERLY.

CONE-BAKING DEVICE.

14,439. Specification of Reissued Letters Patent. Reissued Mar. 5, 1918.

Original No. 1,091,729, dated March 31, 1914, Serial No. 702,964, filed June 11, 1912. Application for reissue filed August 13, 1915. Serial No. 45,436.

*To all whom it may concern:*

Be it known that I, FREDERICK A. BRUCKMAN, residing at Portland, in the county of Multnomah and State of Oregon, have invented certain new and useful Improvements in Cone-Baking Devices, of which the following is a specification.

My present invention is an improved construction of ovens for use on ice cream cone molding devices of the type embodied in my co-pending application filed May 11, 1910, Serial #560,568. In this case as well as in that case, the molding devices include a pair of sectional female mold members and a male core member, the same members being mounted on a rotatable wheel.

At times, in machines of my application referred to, the female molds are separated or opened up to discharge the molded product, and in the application above referred to, the molded product is baked before being discharged by a set of gas burners, over which the molds pass during a part of their travel, each female mold section carrying one-half of an oven the top for which is carried by the male mold devices.

During the passage of the molding devices from one position to another in the machine referred to, some of the effective heat from the burners is dissipated between adjacent molding devices.

It is therefore the object of my present invention to so improve the oven construction, that none of the heat of the burners will pass between adjacent sets of molding devices during their movement from one position to another.

With this end in view, the invention consists in its general nature in providing the female mold sections with hinged oven members and securing one of the oven members of one set of molding devices to the next opposing oven member of the next adjacent set of molding devices, in such a manner as to prevent a space occurring through which the heat from the burners would be dissipated, and also when the molding devices open and thereby bring the adjacent sets closer together the oven sections will telescope.

Another object of the present invention is to provide the oven cover as a direct part of the cores or male mold members so that the heat from the oven may be conducted to the cores themselves through the cover member.

Another of the objects of the invention is to provide means on the female mold members for preventing the molded product in the several sections from sticking together at the top.

In its more subordinate nature the invention also lies in those novel details of construction, combination and arrangement of parts, all of which will be first fully described and then be specifically pointed out in the appended claims, reference being had to the accompanying drawing, in which:—

Figure 1 is an enlarged top plan view, parts being broken away, of the molds of two sets of molding devices.

Fig. 2 is a front elevation of the same with the molds closed.

Fig. 3 is a section on the line 3—3 of Fig. 1.

Fig. 4 is a front elevation, largely diagrammatic, showing how, when the female molds open, the opposing oven sections of adjacent sets of molds are moved together and telescope.

Fig. 5 is a diagrammatic top plan view of two sets of molding devices mounted on the rotatable wheel.

Fig. 6 is a detail perspective view of one of the oven sections.

In the drawings, like numerals and letters of reference indicate like parts in all of the figures.

2 is the pivotal axis on which the wheel 4 is mounted. The wheel 4 carries the molding devices which are each composed of a pair of female mold sections 5, and a single male mold section 14. The male mold section 14 includes the cores 15, while the female mold sections 5 include the female molds proper 66. In this form of the invention, the cores 15 are formed with lateral projections 16 which form the oven covers. The female mold sections are hinged at 6 to the wheel and are adapted to separate on such hinge 6 to open the molds. The cores 15 are secured to the bar 14 by screws as at 83.

84 designates the oven sections which are pivoted at 251, near their upper ends, to the projections 252, at the front and back of the female mold sections. Each oven section 84 has its top curved over, as at 253, to fit under the cover 16, and it is also provided with end portions 85 that telescope within the end plates 254 that are fixed to the female mold sections, as best indicated in Fig. 4 of the drawing.

The oven sections 84 are so designed that their lower side edges will meet, as at 255, and the opposing oven sections 84 of adjacent molding devices are hinged together, as at 256, so that the contacting edges 255 may remain in engagement with each other. In this form of the invention, also, I have provided mold baffles or partitions 257 on the tops of the female mold members between each die proper. This is to prevent the cones from sticking together at their tops and cause them to drop freely when discharged from the molds.

It will be noticed from the drawings that the partitions 257 extend above the top of the mold a sufficient distance to prevent the normal charge of batter from flowing from one mold section over to the other and thus the cones and their trimmings are prevented from sticking together at their tops.

17 designates the gas burner from which the necessary heat for baking purposes is derived, there being any number of such burners employed as conditions may make necessary.

In the operation of the invention, the wheel 4 is turned through a suitable step by step power mechanism, whereby the burners 17 apply their heat directly into one oven section 84 of a set of molding devices and then into the other section of the same set, so that the heat will circulate in the direction of the arrows in Fig. 3 during one step and reverse its circulation during the next step.

From the foregoing description taken in connection with the accompanying drawing, it is thought the complete construction, operation and advantages of the invention will be apparent to those skilled in the art.

What I claim is:

1. In a machine of the class described, a set of separable mold members including female mold members and male mold members therefor, oven members hinged to said female mold members to have telescopic movement with relation thereto, and means connecting adjacent ones of said oven members, together with oven covers carried by said male mold members to coöperate with said oven members.

2. In a machine of the class described, a pair of female mold members including supporting arms hinged together at one end of each, dies or molds proper carried by said arms and each including a plurality of molding sections, upwardly projecting partitions carried by said sections to prevent the molded product in the several sections from sticking together at the top, and oven members for applying heat to said molds.

3. In a machine of the class described, a plurality of sets of molding devices, each including a pair of female mold sections and cores for the same, said female mold sections being movable toward and from each other, front and back oven plates carried by said sections, and side oven members pivoted to said sections to telescope with relation to said front and back plates, means for applying heat beneath said oven members, and means for securing adjacent side oven members of said molding devices together to prevent dissipation of heat between adjacent molding devices.

4. In a machine of the class described, a plurality of sets of molding devices, each including a pair of female mold sections and cores for the same, said female mold sections being movable toward and from each other, front and back oven plates carried by said sections, and side oven members pivoted to said sections to telescope with relation to said front and back plates, means for applying heat beneath said oven members, and means for securing adjacent side oven members of said molding devices together to prevent dissipation of heat between adjacent molding devices, said cores including oven covers coöperating with said side oven members.

5. In a machine of the class described, a plurality of sets of molding devices, each including a pair of female mold sections and cores for the same, said female mold sections being movable toward and from each other, front and back oven plates carried by said sections, and side oven members pivoted to said sections to telescope with relation to said front and back plates, means for applying heat beneath said oven members, and means for securing adjacent side oven members of said molding devices together to prevent dissipation of heat between adjacent molding devices, upwardly projecting partitions carried by said female mold members between each molding or die portion of the same to prevent adherence between the respective molded products.

6. In a machine of the class described, a plurality of sets of molding devices, each including a pair of female mold sections and cores for the same, said female mold sections being movable toward and from each other, front and back oven plates carried by said sections, and side oven members pivoted to said sections to telescope with relation to said front and back plates, means for applying heat beneath said oven members, and means for securing adjacent side oven members of said molding devices together to prevent dissipation of heat between adjacent molding devices, said cores including oven covers coöperating with said side oven members, upwardly projecting partitions carried by said female mold members between each molding or die portion of the same to prevent adherence between the respective molded products.

7. In a machine of the class described, a pair of separable female molds each including a plurality of molding sections or chambers, upwardly projecting partitions carried by said molds between said mold sections, said partitions projecting upwardly above the tops of the molds a distance sufficient to prevent the molded product in the several sections from sticking together at the top.

8. In a machine of the class described, a pair of separable female molds each including a plurality of molding sections or chambers, upwardly projecting partitions carried by said molds between said mold sections, said partitions being of a sufficient height to project above the tops of the female molds a distance sufficient to prevent the molded product in the several sections from sticking together at the top, and oven members for applying heat to said mold members.

9. In a machine of the class described, a pair of separable female mold members having a plurality of molding sections, upwardly projecting partitions carried by said sections, and extending upwardly above the normal batter level a sufficient distance to prevent the molded product in the several sections from sticking together at the top, male mold members for entering the female mold sections and oven elements carried by said mold members for applying heat to the mold.

10. In a machine of the class described, a plurality of sets of molding devices each including a pair of female mold sections and cores for the same, said female mold sections being movable toward and from each other, front, back and side oven members carried by said female mold sections, means for applying heat within said oven members, upwardly projecting partitions carried by said female mold members between each molding or die portion of the same, said partitions extending a sufficient distance above the normal batter level to prevent adherence between the respective molded products.

11. In a machine of the class described, a pair of separable female mold members having a plurality of molding sections, upwardly projecting partitions carried by said sections, said partitions extending upwardly a sufficient distance above the normal batter level to prevent the molded product in the several sections from sticking together at the top, a male mold member having a plurality of cores for entering the female mold sections and extending over the female mold members and said partitions, and oven members carried by said mold members for the application of heat to said mold members.

FREDERICK A. BRUCKMAN.